(12) United States Patent (10) Patent No.: US 7,947,211 B2
Natan (45) Date of Patent: May 24, 2011

(54) CATALYTIC NANOTEMPLATES

(75) Inventor: Michael J. Natan, Los Altos, CA (US)

(73) Assignee: Cabot Security Materials Inc., Mountain View, CA (US)

( * ) Notice: Subject to any disclaimer, the term of this patent is extended or adjusted under 35 U.S.C. 154(b) by 302 days.

(21) Appl. No.: 11/753,433

(22) Filed: May 24, 2007

(65) Prior Publication Data

US 2008/0096019 A1    Apr. 24, 2008

Related U.S. Application Data

(60) Provisional application No. 60/806,220, filed on Jun. 29, 2006.

(51) Int. Cl.
*B29C 41/42* (2006.01)
(52) U.S. Cl. .......................... 264/334; 264/338; 977/890
(58) Field of Classification Search .................. 428/403, 428/404, 405, 406, 407
See application file for complete search history.

(56) References Cited

U.S. PATENT DOCUMENTS 6,284,345 B1 * 9/2001 Ruoff ............................ 428/143
2006/0068127 A1 * 3/2006 Melechko et al.

FOREIGN PATENT DOCUMENTS

WO    WO2005101466 A2 * 12/2004

OTHER PUBLICATIONS

Chah et al "Nanostructured . . . Templates " JCIS vol. 250, Apr. 23, 2002.*
Liu et al "Preparation of . . . Tetrapods" Nano Letter vol. 4 No. 12 (2004).*
Chah, S., et al. "Nanostructured Gold Hollow Microspheres Prepared on Dissolvable Ceramic Hollow Sphere Templates," Journal of Colloid and Interface Science, vol. 250, published online Apr. 23, 2002, pp. 142-148, Retrieved from the Internet at http://people.clarkson.edu/~janoslapb/300.pdf.
Liu, H. et al., "Preparation of Asymmetric Nanostructures Through Site Selective Modification of Tetrapods," In: Nano Letter, vol. 4, No. 12 (2004), pp. 1-18, Retrieved from the Internet at http://www.osti.gov/energycitations/product.biblio.jsp?osti_id=877638.
International Search Report, prepared for PCT application No. PCT/US2007/071631, by the U.S. patent and Trademark Office as International Search Authority, Jun. 10, 2008, 3 pages.

* cited by examiner

*Primary Examiner* — Ramsey Zacharia
(74) *Attorney, Agent, or Firm* — Swanson & Bratschun, L.L.C.

(57) ABSTRACT

A catalytic nanotemplate including a freestanding template particle and a director associated with the surface of the freestanding template particle. The free standing template particle may have multiple segments and the director may be associated with one or more of the segments. In instances where multiple segments are present, the segments may be made of different materials or be of the same material in different forms. More than one type of director or no director may be associated with any particular segment.

5 Claims, 5 Drawing Sheets

CATALYTIC NANOTEMPLATES

RELATED APPLICATIONS

This application claims priority to provisional application No. 60/806,220, filed on Jun. 29, 2006.

TECHNICAL FIELD

The present invention is directed toward catalytic nanotemplates and more particularly toward reusable templates suitable for synthesizing nanoparticles of select shapes and toward methods of using said templates.

BACKGROUND OF THE INVENTION

Fabricated nanoparticles are playing an increasingly important role in many technological applications. Representative fields where designed nanomaterials yield improved performance when compared to bulk materials or micron-scale materials include energy and fuel engineering where nanoparticles have use in fuel combustion catalysts, as substrates for solar energy conversion and other applications. Similarly nanoparticles have multiple uses in health care including use in therapeutics, drug delivery devices, and as detection modalities for diagnostics. Nanoparticles may also be used in computing, for example, as transistors and other electronic devices or as storage media, as structural materials for improved strength or tensile properties, and in a host of other applications.

In certain cases, it is the composition of nanoparticles that determine particle performance or the properties of interest. In other cases, the size of a nanoparticle or the surface area, or the ratio of surface atoms to bulk atoms dictates particle performance characteristics. Likewise, in certain applications it is the shape of nanoparticles that dictates observed properties. In many instances, it is a combination of factors. For example, in surface enhanced Raman scattering (SERS), molecules positioned in close proximity to nanometer-scale noble metal nanoparticles exhibit large increases in scattering intensity owing to increases in the electromagnetic fields at the particle surface. SERS has been extraordinarily well-studied from both the experimental and theoretical perspective, and it is now well understood what factors control or influence the behavior of SERS-active materials. In particular, with respect to SERS applications, nanoparticle composition, size and shape are all important factors in predicting the enhancement at a given excitation wavelength.

It is possible to synthesize single nanoparticles. It is also possible to make large numbers in parallel. For the study of fundamental properties, small numbers of nanoparticles may be sufficient, and studies of the properties of single nanoparticles abound. For commercial applications, generally larger numbers of particles may be necessary. For example, if $10^7$ nanoparticles are needed for each dose of a nanoparticulate drug, and $10^8$ doses are desired, a total of $10^{15}$ nanoparticles are desired. While the quantity requirements for particles for health care may appear large, it is relatively small compared to materials science or engineering applications where tons of material may be needed.

Nanoparticles can be fabricated in the solid phase, in the liquid phase, and in the gas phase. Depending on how the nanoparticles are made, certain shapes of particles tend to be preferred. The most common shape of nanoparticle is spherical or semispherical. Nanoscale spherical objects are actually faceted nanocrystals that closely resemble spheres. Other common shapes include plates and tubes, for example carbon nanotubes. Recently, it has become possible to fabricate nanoparticles of a variety of more complex, anisotropic shapes, including cubes, prisms, and even tetrapods. Likewise, methods have been described that yield core-shell particles, hollow particles, and onion-like particles within particles. Presently, most of these shapes can only be fabricated through solution-based methods, which typically offer greater flexibility with respect to available processing steps than solid phase or gas phase fabrication methods.

Various methods of nanoparticle growth have been studied, and often can be described in the terms used for the fabrication of polymeric materials: initiation, growth, termination. A first approach to solution based nanoparticle synthesis employs these steps. Initiation involves formation of a seed particle, which grows in size until depletion of material for growth leads to termination. The shape of the seed can often dictate the final shape of the nanoparticle. For example, spherical seeds most often lead to spherical final nanoparticles. In some cases, though, spherical seeds can lead to highly anisotropic particles, because of widely differential growth rates on certain crystal faces of a material. The differential growth method has been used with great success in forming semiconductor particles and metallic nanoparticles with non-spherical shapes.

Despite the general advantages of solution-based nanoparticle synthesis methods over gas phase and solid phase methods, and despite the proven successes in making non-spherical nanoparticles, typical solution fabrication methods are severely limited regarding the possibility of designing non-typical nanoparticle shapes. For example, only high symmetry species can be prepared, meaning that only a small fraction of shape space can be sampled. Therefore, the ability to make nanoparticles in the shape of for example, an open tube, or an arrow, or a spiral, or a hook, a letter of the alphabet, or other complex shapes, is well beyond the capabilities of known solution-based syntheses methods.

Such complex shapes would be highly interesting from a fundamental perspective, and more importantly, could have significant performance benefits. For example, a particle in the shape of a test-tube might be excellent for the controlled release of molecules. Arrow-shaped particles might exhibit superior flow properties, and might exhibit improved penetration into skin compared to spherical particles in uses such as gene delivery. Hook-shaped particles may provide adherence via physical methods, potentially eliminating the need for van der Waals, ionic, or covalent chemical bonding or attachment interactions. Nanoparticles with alphabet shapes might be used as nanoscale taggants for brand security and/or anti-counterfeiting applications. In SERS applications, there are a variety of shapes that might generate unprecedented enhancements. High performance shapes might be even more complex than hooks, arrows, or spirals.

A second approach to nanoparticle synthesis in solution features the use of templates. Templates dictate the shape of synthesized nanoparticles by confining particle growth to the dimensions defined by the inside the template. For example, semiconductor nanoparticles can be made by precursor precipitation within fused vesicles. In such embodiments, the nanoparticle is constrained in size by the size of the vesicle, which in turn dictates the amount of precursor. Furthermore, the particles generally adopt the shape of the vesicle, which is typically spherical. A second example involves striped metallic nanorods, which may be prepared by sequential electrochemical deposition in to cylindrical pores. The particle diameter is defined by the pore diameter, and the particle length is defined by the number of stripes, and the length of each stripe. In principle, templates can be created with pores of different shapes, causing different shapes of particles to be formed. For example, a simple variation of a cylindrical pore is a toothpick-shaped pore, i.e. a cylinder with a reduced diameter at one end, and an expanded diameter at the other.

Current template-based methods of nanoparticle formation are also extremely limited in several respects. In the case of electrochemically-generated striped metallic nanowires, the growth method only works for conductive materials. Much more importantly, the nature of typical template synthesis is inherently two-dimensional. Synthesis is only occurring within the pores of the template, which is essentially a plane of growth situated in a three-dimensional solution. Thus, the number of particles fabricated per unit time is not defined by the volume of solution but rather by the number of pores in the template, typically $10^8$-$10^{10}$ pores per square cm. This compares poorly with conventional solution-based nanoparticle syntheses, where $10^{11}$-$10^{15}$ particles can be made simultaneously in solution, leveraging the inherently three dimensional nature of a solution.

Yet another significant weakness of known template synthesis methods is the inefficient use of the template itself. In the case of striped metal nanoparticles, the particles are freed by template destruction (via dissolution), so only one particle is synthesized per pore. In certain instances, where the particle length is small compared to the pore length, many particles may be synthesized in a pore, but even then, the template is destroyed to release the particles. In the case of vesicle or micellar synthesis, the particles are isolated with a lipid coating, which is then removed. In another example of template-directed particle synthesis, a typically spherical particle core is used as a template, and a shell particle is grown over it. If the core particle is consumed in the shell synthesis, a hollow particle ensues; when it is not, the core remains inside the shell. In both cases, the template can not be re-used. In short, known template-directed methods are stoichiometric, and do not provide the opportunity for template re-use. In the specific case of the synthesis of striped metallic nanowires, this is not problematic, as the templates are readily available and are relatively inexpensive. However, similar templates having pores defining novel shapes such as arrows, spirals, hooks, or alphabet letters would require extraordinary means (such as LIGA or nanoimprint lithography or e-beam lithography or MEMS or NEMS) to fabricate. These are inherently two dimensional methods that can generate only relatively small numbers of templates, at high cost, making synthesis impractical to accomplish in a stoichiometric manner.

Thus, while known templates offer a method to make particles that might not be possible by the seed-based growth of particles in solution, these techniques are limited both by the inefficient use of the template material, and in many cases, further limited by the two-dimensional nature of the growth process. For unusual shapes, a further and substantial limitation is the cost of template fabrication. It is therefore not possible by any known method to make large numbers of nanoparticles of selected complex shapes.

The present invention is directed toward overcoming one or more of the problems discussed above.

SUMMARY OF THE INVENTION

One aspect of the present invention is a catalytic nanotemplate including a freestanding template particle and a director associated with the surface of the freestanding template particle. The free standing template particle may have multiple segments and the director may be associated with one or more of the segments. In instances where multiple segments are present, the segments may be made of different materials or be of the same material in different forms. More than one type of director or no director may be associated with any particular segment.

The director may be an oxide, nitride, a self-assembled monolayer, organothiols, and organophosphonate, a polymer, a metal, or any other material suitable for growing or inhibiting the growth of a nanoparticle.

In use, the catalytic nanotemplate serves as a template for the growth of a nanoparticle. Typically, the nanoparticle is grown on or in association with the director and then released from the nanotemplate. In an alternative embodiment, the nanoparticle may be grown directly on a freestanding template particle without the use of a director. The nanoparticle may be released by dissolving or otherwise affecting the director. Alternatively, the nanoparticle may be released by mechanical or other physical means.

Accordingly, another aspect of the present invention is a method of synthesizing a nanoparticle which includes providing a freestanding template particle associated with a director and selectively forming the nanoparticle on the director. In addition, the method includes releasing the nanoparticle from the director and freestanding template particle. Embodiments where no director is associated with the freestanding template particle are within the scope of this invention. The method of synthesizing a nanoparticle will preferably include recovering the freestanding template particle and if necessary, re-associating the freestanding template particle with director. Accordingly, the nanotemplates of the present invention may be used and reused to synthesize successive batches of nanoparticles.

Another aspect of the present invention is a nanoparticle created by the methods described herein.

DETAILED DESCRIPTION OF THE INVENTION

A preferred catalytic nanotemplate for nanoparticle synthesis would be dispersible in solution, and/or operable in a gas phase as well. The nanotemplate would direct the shape of the nanoparticle to be synthesized. The catalytic nanotemplate would also function as a catalyst, accordingly, it would not be consumed in the production of the particle, and could be reused. Thus, a preferred catalytic nanotemplate would address many of the shortcomings in nanoparticle synthesis. A catalytic nanotemplate would allow particles with unique shapes to be prepared. Catalytic nanotemplates deployed in solution would allow synthesis to occur in three dimensions, and as catalysts, they can be reused.

Figure 1:
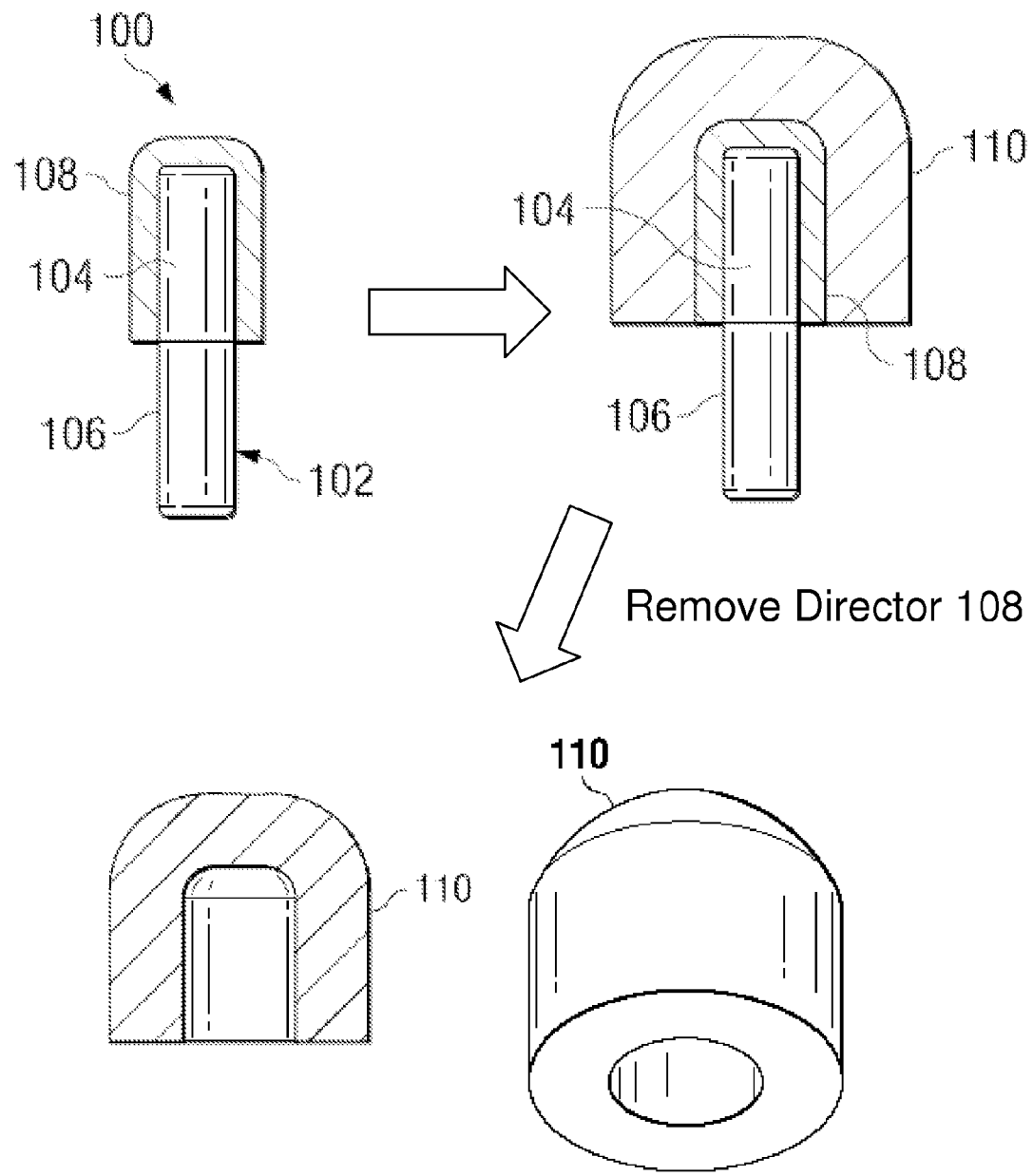
FIGS. 1-7 are diagrams of nanotemplates consistent with the present invention showing various embodiments of freestanding particles, directors, synthesized nanoparticles and the interrelationships between same and particle shape.
Figure 2:
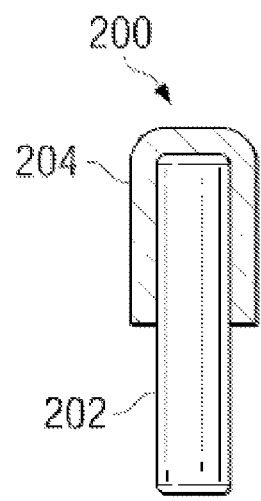

A prototypical catalytic nanotemplate having the characteristics described immediately above, is shown in FIG. 1. The catalytic nanotemplate 100 includes a freestanding cylindrically-shaped template particle 102, having two distinct segments 104 and 106. 104 and 106 are differentially functionalized: Segment 104 is coated with material referred to herein as a "director" 108, whereas segment 108 is not. A nanoparticle 110 is then deposited or grown selectively on the director 108. When this process is complete, director 108 may be selectively removed, resulting in a freestanding, tube-shaped nanoparticle 110, and releasing the freestanding template particle 102. In the foregoing, director 108 has been so named since it directs the location of the generation of nanoparticle 110. In the FIG. 1 example, segments 104 and 106 could be different materials (e.g. Co and Pt), or the same material in different forms (e.g. anatase vs. rutile TiO2, or solid vs. porous Ni). Alternatively, as is shown in FIG. 2, a nanotemplate 200 might comprise a freestanding template particle 202 of a single material having a single composition, but with a director 204 on only part of it. Referring again to FIG. 1 and freestanding template particle 102, it may be possible to remove the synthesized nanoparticle 110 without removing the director 108.

Figure 3:
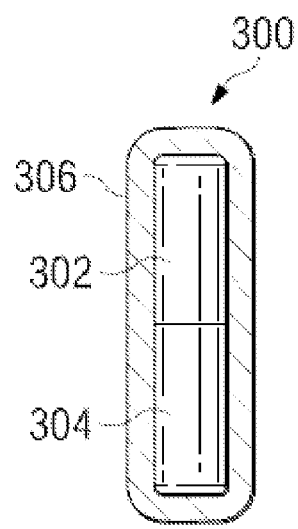

Alternatively as illustrated in FIG. 3, the segments 302 and 304 of a freestanding template particle 300 might both be coated with the same director, 306, such that nanoparticle growth is selective on segment 302, leading after release to the same particle 110 generated in the FIG. 1 example. This could occur because an attribute of the director such as orientation, volume, flexibility, order/disorder, or some other property, is different on the two segments.

Figure 4:
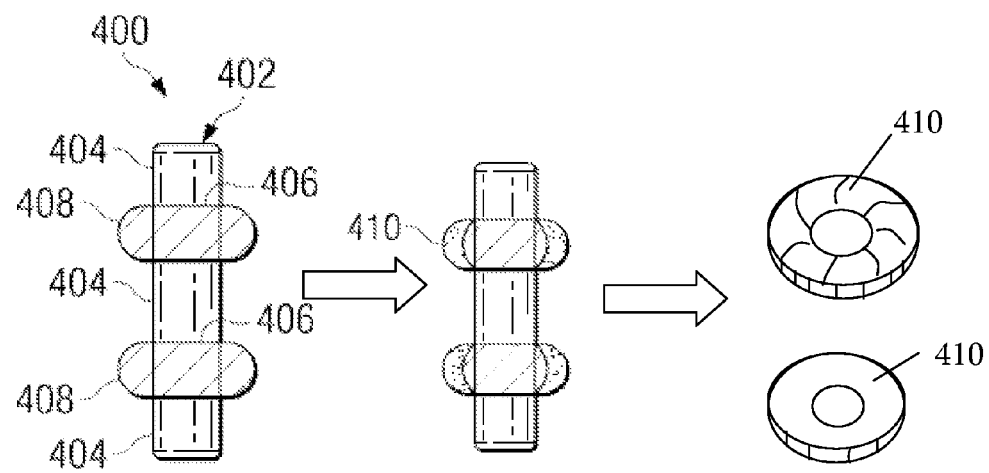

Alternatively, as shown in FIG. 4, a nanotemplate 400 may include a freestanding template particle 402, with alternating segments 404 and 406. the template particle 402 may be associated with a director 408 at segments 406. Particle growth on the director 408 leads to a series of torus-shaped particles 410 after release.

Figure 5:
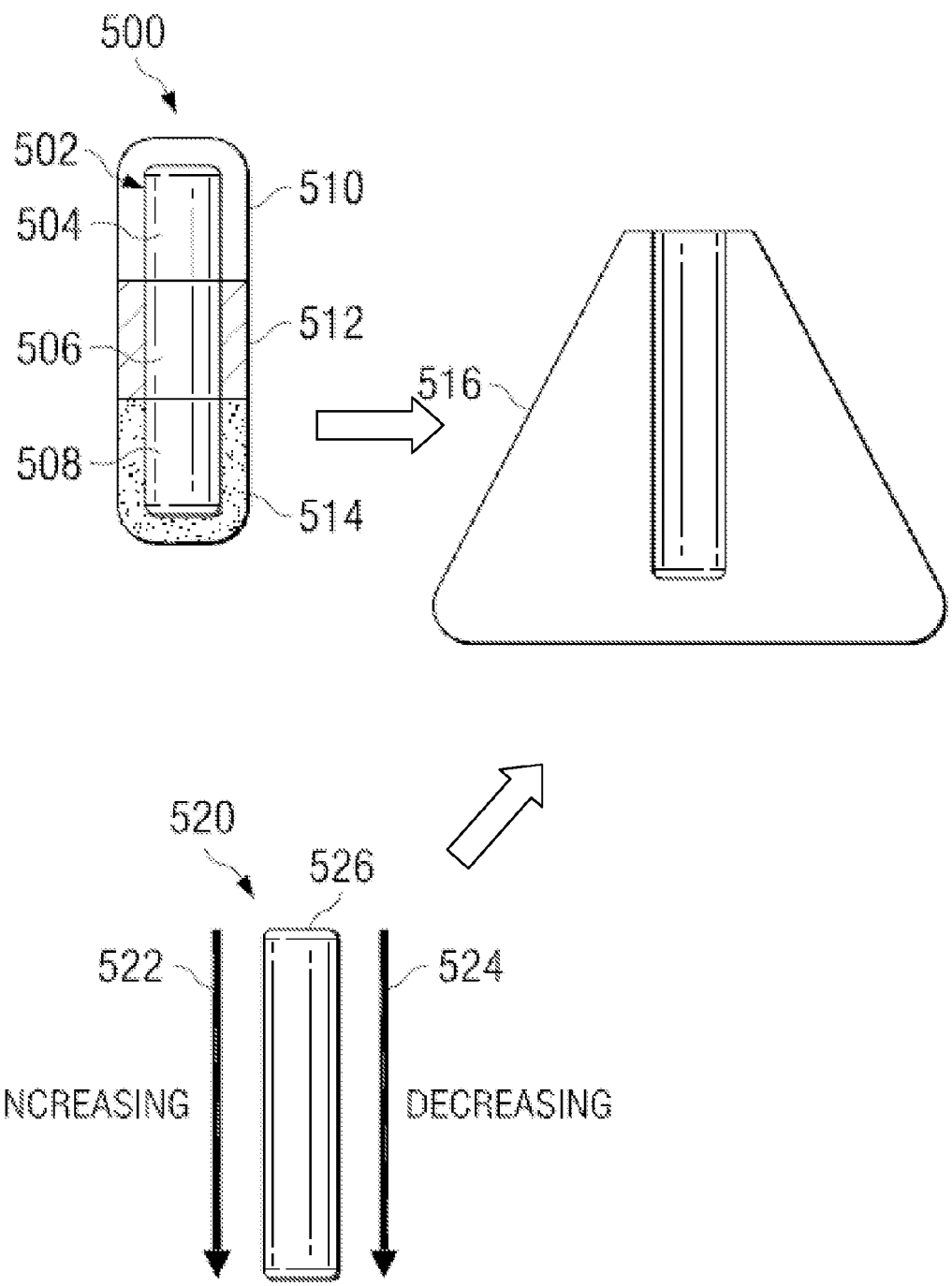

As shown in FIG. 5, a nanotemplate 500 may include a template particle 502 having three segments, 504, 506, and 508, each coated with a different director, 510, 512, and 514, respectively. If nanoparticle growth is precluded on director 510, occurs slowly on director 512, and rapidly on director 514, after director removal, a particle 516 will have been formed that has a tube-like inner surface, but a "beaker-like" exterior surface. Such a particle might also result from template 520, in which there is a continuous gradient in the composition of directors 522 and 524 along the freestanding template particle 526 length.

Figure 6:
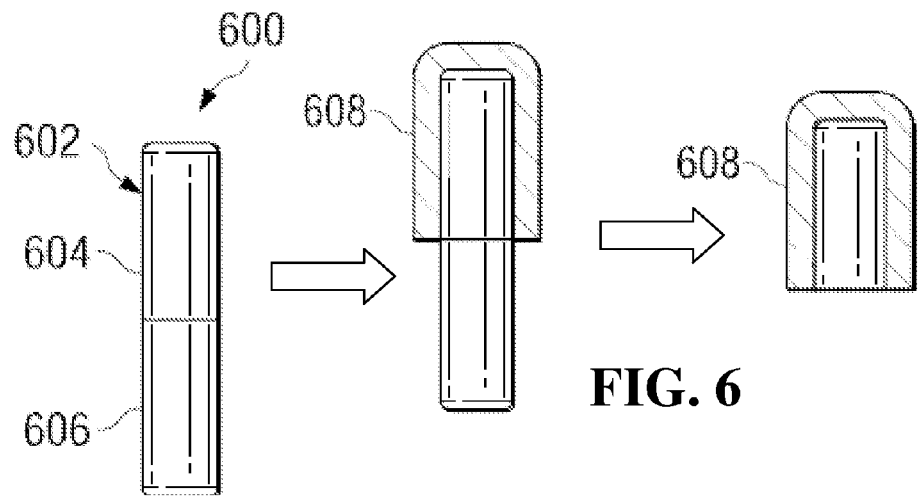
Figure 6:
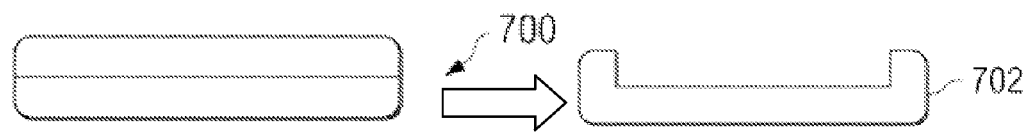
Figure 6:
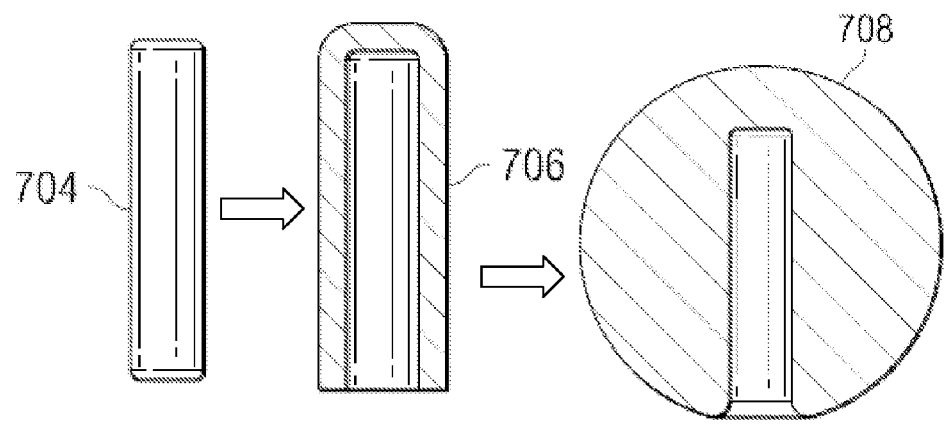

Alternative nanotemplate embodiments may not require a director. For example, see FIG. 6, where a nanotemplate 600 includes a freestanding template particle 602 having segments 604 and 606. Here, particle growth occurs exclusively on segment 604, as a function of the material used for the freestanding template particle 602. This leads again to a tube-shaped particle 608 similar to particle 110, which may be released by a physical method (heating, cooling, expansion, contraction, mechanical agitation, irradiation) or a combination of physical methods.

Figure 7:
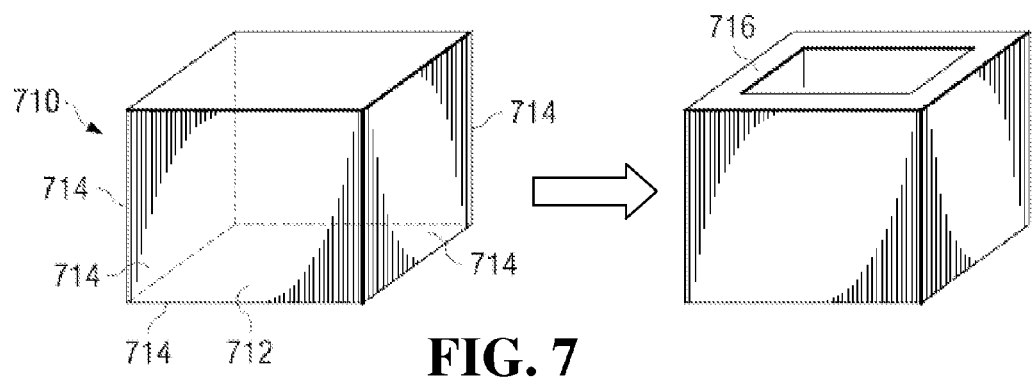
Figure 7:
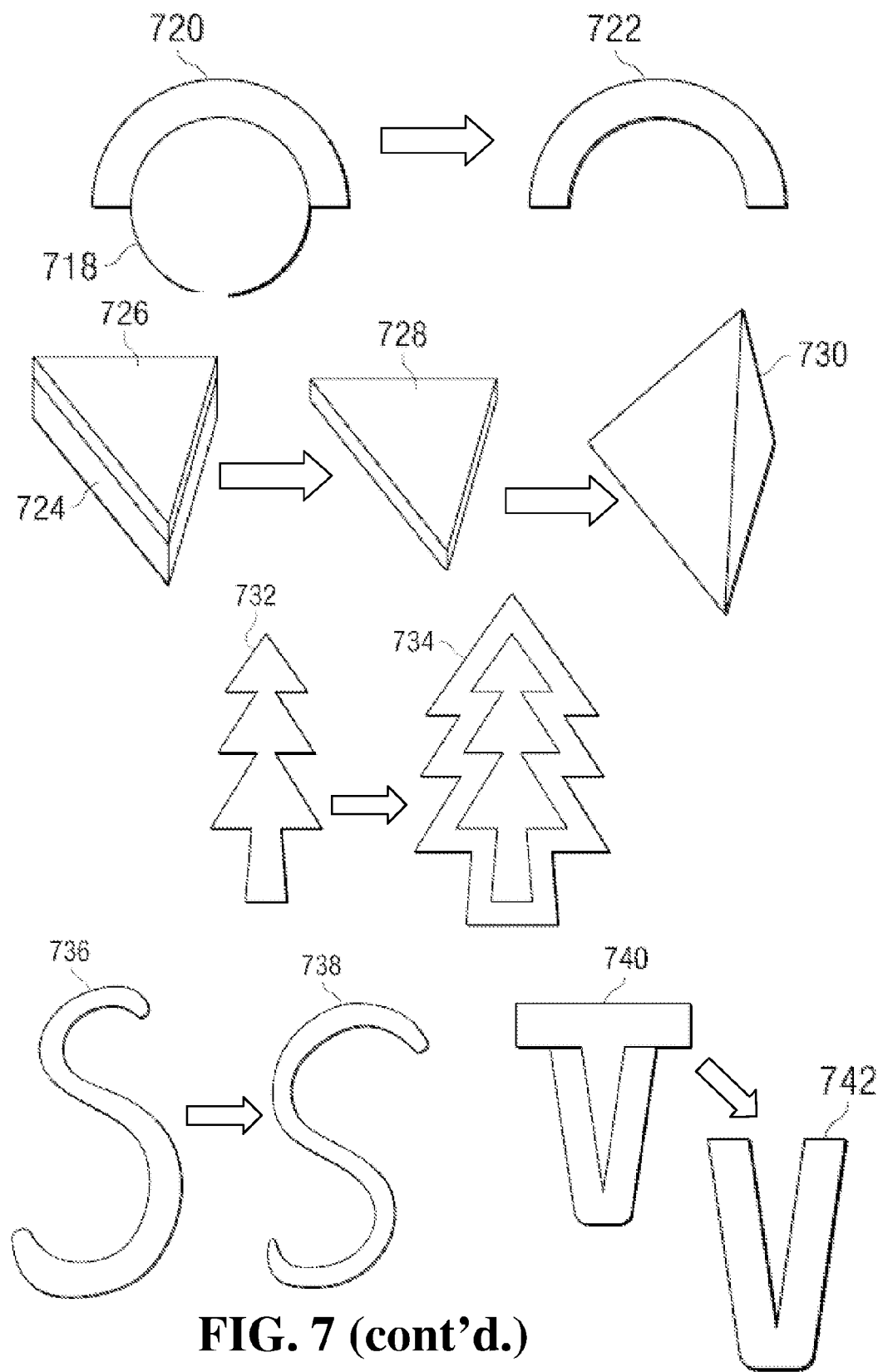

Virtually an infinite number of nanotemplate shapes and resulting particle shapes are possible; a few variations are listed here. Certain shapes are shown in FIG. 7 as examples. Many other shapes are possible. A disk-shaped cylinder nanotemplate 700 will generate a particle 702 that resembles a plate or bowl. Likewise, variation in the nanoparticle growth conditions can lead to different particle shapes from the same template. For example, template 704 can be used to generate both particle 706 (small amount of nanoparticle growth or deposition) or particle 708 (large amount of particle deposition).

A nanotemplate 710 including a cube-shaped freestanding template particle 712 with director 714 on all but one of the six faces will lead to an open-box-shaped nanoparticle particle 716. A sphere 718 with director 720 over one hemisphere will lead to a bowl-shaped nanoparticle 722. A planar freestanding template particle 724 (here, a triangular prism) that has director 722 or 726 one face only (and not on the edges), will lead to a nanoparticle particle of identical shape 728 at a low growth rate, and could lead to the more complex shape 730 at a high growth rate.

More complex synthesized nanoparticle shapes will result from nanotemplates having more complex freestanding template particles and/or more complex positioning of directors. Thus, particle 732 leads to 734, 736 leads to 738, and 740 leads to 742.

A suitable template could be nanosized as discussed above. Alternatively, a template could be micron sized, with nanoparticle growth occurring on part of particle. Or the template could be micron sized, and the resulting template generated particle could also be micron sized, but be nanoscale in one dimension.

Numerous classes of materials can serve as directors, including but not limited to oxides, nitrides, self-assembled monolayers (organothiols, organophosphonates), polymers, and metals. The key attributes of a director are that it provides a means for differential production or deposition of a nanoparticle, and that methods exist to remove said nanoparticle from the director.

In the production of nanoparticle 110, as illustrated in FIG. 1, the director 108 may be selectively removed, freeing nanoparticle 110 and regenerating the freestanding template particle 102. There are a number of ways director removal can occur. It could be completely removed. For example, in the case of a metal or non-metal oxide, the director 108 could be dissolved in acid or base. Likewise, a metal oxide could be reduced to a metal having no affinity for either the template particle 102 or the newly synthesized particle 110. In the case of a lipid, it could be dissolved by exposure to an organic solvent; conversely, for nanoparticle syntheses occurring in organic solvents, the director 108 could be dissolved by dissolution in an aqueous solvent. In the case of an organothiol SAM bound to Au, tightly-bound organothiol groups could be oxidized to sulfonates, which have very low affinity for Au. Note that in some of the preceding examples, the director 108 is consumed, while in others, it is removed but not consumed.

In embodiments where the director 108 is removed, it is not necessarily to act specifically on the director 108. Rather, it may be possible in certain instances to remove the director by action on the underlying material, i.e., by selective action on the material of segment 104 of freestanding particle 102. For example, if segment 104 were Au and segment 106 were an insulator, visible or near-IR light irradiation might be employed to selectively excite Plasmon bands in the Au, leading to local heating, which could lead to removal of the director 108. Such effects could also be induced by exposure to magnetic fields, heating, cooling, or other physical phenomena that would impact the attachment of director 108 to segment 104.

Alternatively, the director could remain bound to the template after release of the nanoparticle. Thus, it could be that heating or cooling (or some other physical or chemical action) on the director 108 causes it to become more or less ordered, or undergo a phase transition, such that the newly formed nanoparticle 110 is released. This is analogous to the heat-cool cycles, or low salt-high salt transitions that are routinely used to remove newly synthesized sequences of nucleic acids on complementarily-sequenced DNA templates.

It is important to point out that directors are not limited to use to encourage or direct the deposition or growth of nanomaterials. Directors could also equally well be used to retard or completely prevent growth or deposition. In a growth prevention embodiment, nanoparticle release may occur by physical methods rather than the chemical methods described above.

Numerous methods are available to deposit directors. Self assembled monolayers (SAMs) can be used, for example alkanethiols or alkane phosphonates. It is well know that SAMs form easily on certain surfaces, with more difficulty on others, and not at all on others. Such properties can be exploited to direct the positioning of the director. Likewise, SAM properties such as contact angle and orientation depend strongly on the underlying surface, and these properties could be used to accelerate or retard formation of the nanoparticle. SAM formation has both kinetic and thermodynamic components, and each could be used in direction processes.

Another route to director deposition is through temporary or permanent restricted access, including via diffusion. For example, evaporation of a material onto spheres on a planar surface will cause only half (or less) of the sphere's surface to be covered, generating differential coverage of director on a catalytic nanotemplate of uniform composition. Likewise, dipping and removing from solution can be used to form a gradient in director.

Alternatively, directors can be deposited by directional reactions. For example, a limited amount of reagents which react with a surface to form a surface-confined film can be introduced into a tube. Reaction causes director formation starting at the tube entrance, but the reagents are depleted before the film formation reaches the tube exit, thereby generating a film gradient. Such a film could be the director, or could be used to subsequently deposit the director.

Another approach to deposition of directors is through spatially defined patterning. Thus, all forms and variants of lithography, including but not limited to conventional photolithography, dip-pen nanolithography, nanoimprint lithography, interference lithography, LIGA, x-ray lithography, and e-beam lithography can be used to generate well-defined patterns of substances on planar or non-planar surfaces.

An important component of this approach to nanoparticle synthesis is the recovery of the template. If the template cannot be recovered and reused, then the process is stoichiometric with respect to the template. In contrast, if the template can be recovered and reused many times, the template is catalytic, and by analogy to molecular catalysis, the turnover number can be used to represent the number of times the catalyst is involved in a chemical reaction. For catalytic templates, a minimum turnover number of 2 is required. Ideally, the turnover number can be in the millions or billions. Numerous methods to recover the template can be used, including but not limited to centrifugation, chromatography, filtration, evaporation, and crystallization. Likewise, physical properties of the template or the nanoparticle, including but not limited to magnetic properties, electrical properties, mechanical properties, optical properties, density, volume, and shape can be used as means of separation.

It is important to note that recovery of the template is not a pre-requisite for high turnover. Like molecular catalysts, turnover can be continuous in the phase the templating is occurring, whether it is gas, solid, or liquid. Ideally, the addition of nanotemplates to a reaction vessel containing a stoichiometric or catalytic amount of director and excess nanoparticle components could spontaneously lead to repetitive particle formation. Alternatively, like the polymerase chain reaction process for nucleic acid amplification, in which the template is freed by heating, many turnovers can be achieved by deliberate steps for template release, without the need to recover or isolate the template itself.

EXAMPLES

The following examples are provided for illustrative purposes only and are not intended to limit the scope of the invention.

Example 1

A specific example of this process is the formation of a tube-shaped particle 110, using the rod-shaped nanotemplate 100. The rod can be a striped nanoparticle with one Pt stripe and one polypyrrole or similar polymer stripe; such particles are straightforward to prepare by sequential electrodeposition into cylindrical pores. Typical dimensions for such a freestanding particle template 102 could be 250 nm in diameter and 2 microns in total length, with each stripe being one micron in length. In ethanol, 3-mercaptopropyltrimethoxysilane (MPTMS) will selectively bind, polymerize, and thereby become immobilized selectively on the Pt stripe. Subsequently, Au can be selectively deposited on the MPTMS, forming a tube shaped particle. The resulting particle can be released from the thiol group, by treatment with strong base, by mechanical disruption, or by other means.

While the invention has been particularly shown and described with reference to a number of embodiments, it would be understood by those skilled in the art that changes in the form and details may be made to the various embodiments disclosed herein without departing from the spirit and scope of the invention and that the various embodiments disclosed herein are not intended to act as limitations on the scope of the claims.

What is claimed is:

1. A method of synthesizing a nanoparticle comprising:
   providing a freestanding template particle;
   associating a director with a surface of the freestanding template particle;
   selectively forming a nanoparticle on the director; and
   releasing the nanoparticle from the director and freestanding template particle without consuming the freestanding template particle.

2. The method of claim 1 wherein the releasing step comprises completely removing the director.

3. The method of claim 2 further comprising:
   recovering the freestanding template particle;
   re-associating the freestanding template particle with the director.

4. The method of claim 1 wherein the releasing step comprises removal of the nanoparticle from the director and freestanding template particle without substantially removing the director.

5. The method of claim 4 comprising recovering the freestanding template particle and director association.

* * * * *